(12) United States Patent
Schena et al.

(10) Patent No.: US 8,418,969 B2
(45) Date of Patent: Apr. 16, 2013

(54) SPLIT SECTOR GEAR

(76) Inventors: Anthony Schena, Plymouth, MA (US); Michael Mason, Halifax, MA (US)

(*) Notice: Subject to any disclaimer, the term of this patent is extended or adjusted under 35 U.S.C. 154(b) by 0 days.

(21) Appl. No.: 12/836,551

(22) Filed: Jul. 14, 2010

(65) Prior Publication Data

US 2011/0095138 A1    Apr. 28, 2011

Related U.S. Application Data

(60) Provisional application No. 61/225,353, filed on Jul. 14, 2009.

(51) Int. Cl.
*B61L 1/02* (2006.01)

(52) U.S. Cl.
USPC ............... 246/219; 246/125; 246/159

(58) Field of Classification Search ......... 246/297, 246/219; 74/434, 446, 447, 640, 439
See application file for complete search history.

(56) References Cited

U.S. PATENT DOCUMENTS

| | | | | |
|---|---|---|---|---|
| 686,971 | A | * | 11/1901 | James .......................... 19/241 |
| 2,638,537 | A | * | 5/1953 | Van Tassel ................ 246/219 |
| 2,649,537 | A | * | 8/1953 | Smith ........................ 246/159 |
| 3,038,991 | A | * | 6/1962 | Swanton .................... 246/125 |
| 5,389,044 | A | * | 2/1995 | Bandy et al. ................ 474/96 |
| 6,267,352 | B1 | * | 7/2001 | Semeyn et al. ........ 251/129.12 |
| 7,561,066 | B2 | * | 7/2009 | Ashton ...................... 340/907 |
| 2007/0102592 | A1 | * | 5/2007 | Ashton .................. 246/473 R |
| 2009/0205451 | A1 | * | 8/2009 | Bayer et al. .................. 74/325 |
| 2011/0095138 | A1 | * | 4/2011 | Schena et al. ............ 246/219 |

OTHER PUBLICATIONS

International SearchReport; PCT/US1010/042025; L.W. Young; Aug. 9, 2010.
http://www.twincomfg.com/Automatic_Train_Stops/Twinco_AutomaticTrainStop.htm, Jul. 26, 2010.
http://www.ansaldo-sts.com/export/sites/default/en/attachments/usa_catalog/RSE_3/Train_Stops/RSE_3D1_EM_1_T_stop.pdf, 2009.

* cited by examiner

*Primary Examiner* — Jason C Smith
(74) *Attorney, Agent, or Firm* — Fish & Richardson P.C.

(57) ABSTRACT

A sector gear split into sections for secure engagement around a tripper shaft, allowing the gear to be replaced in less time, by a smaller crew, and with fewer tools.

10 Claims, 3 Drawing Sheets

SPLIT SECTOR GEAR

CROSS-REFERENCE TO RELATED APPLICATIONS

This application claims the benefit of U.S. Provisional Application Ser. No. 61/225,353, filed on Jul. 14, 2009.

TECHNICAL FIELD

This invention relates to rail transportation.

BACKGROUND

Train stops or trippers typically have unitary sector gears.

Train stops are used with wayside signals in rapid transit systems to ensure observance of, and compliance with, speed restrictions and red signals. Failure to comply with signals results in automatic activation of the train's braking system without any action on the part of the train operator.

SUMMARY

According to the disclosure, an sector gear is split into sections for secure engagement around a tripper shaft, whereby the gear is replaced in less time, by a smaller crew, and with fewer tools.

Embodiments may include one or more of the following additional features. The gear is split into halves. The gear sections are secured around the tripper shaft with bolts.

In some aspects, sector gears include: a first portion with a first end defining gear teeth and a second end including a member configured to engage a resilient member; a second portion detachably attachable to the first portion; wherein the first portion can be attached to the second portion such that the first portion and the second portion together define a circular aperture sized to receive a shaft of a train stop. Embodiments may include one or more of the following additional features.

In some aspects, train stops include: a motor; a circuit breaker configured to operate the motor; a sector gear mechanically connected to the motor such that operation of the motor rotates the sector gear in a first direction, the sector gear comprising: a first portion with a first end defining gear teeth and a second end including a member configured to engage a spring; a second portion detachably attachable to the first portion; wherein the first portion can be attached to the second portion such that the first portion and the second portion together define a circular aperture sized to receive a shaft of the train stop; the shaft of the train stop extending to a tripper arm disposed outside a casing of the train stop; and the spring biasing the sector gear to rotate a second direction opposite the first direction.

In some embodiments, the first portion and the second portion define aligned threaded recesses such that the first portion can be bolted to the second portion. In some cases, sector gears include Allen bolts attaching the first portion to the second portion.

In some embodiments, the first portion defines a threaded recess extending from a surface that defines a portion of the circular aperture through the first portion to an opposite side of the first portion, the threaded recess sized to receive a set screw.

In some embodiments, the first portion defines a keyway on a surface that defines a portion of the circular aperture.

The split sector gear has considerable advantages over the gear now in use.

The new split sector gear is designed to bolt on to the shaft, cutting installation time down to about 30 minutes. This reduces the time that a work crew is on the "rails" holding up train traffic. It also reduces the crew size from 4 people to 2 people.

This also reduces the number of tools that must be transported by truck or train to the work site. All the crew needs now to change out a new split sector gear of the disclosure is a set of Allen wrenches and a basic tool bag.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1A:
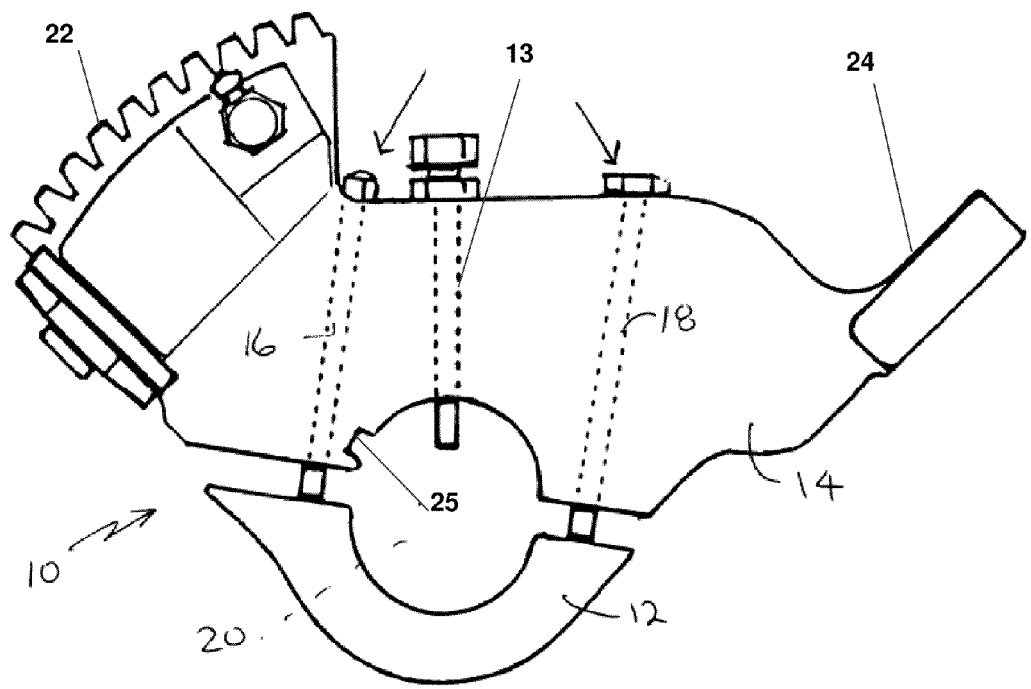
FIG. 1A is a side view of a split sector gear of the disclosure.
Figure 1B:
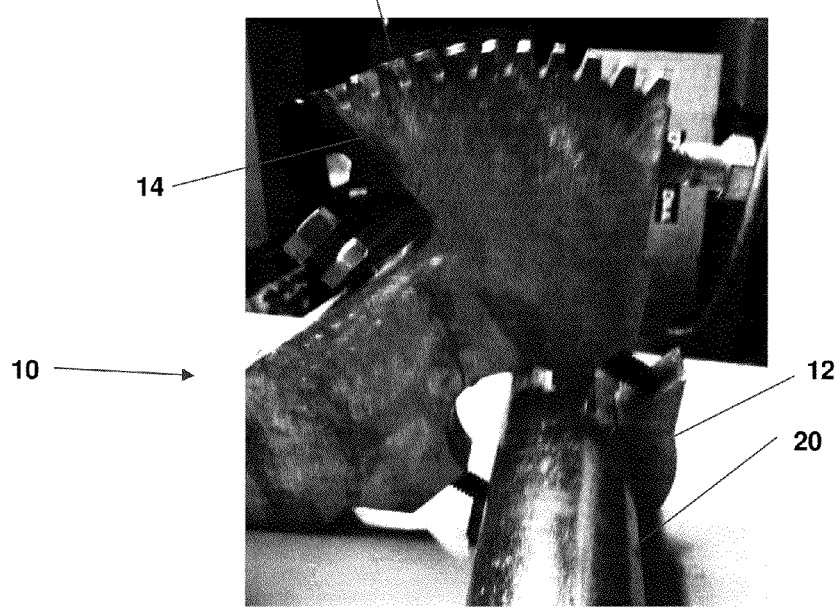
FIG. 1B is a side view of the split sector gear being attached to a shaft.
Figure 1C:
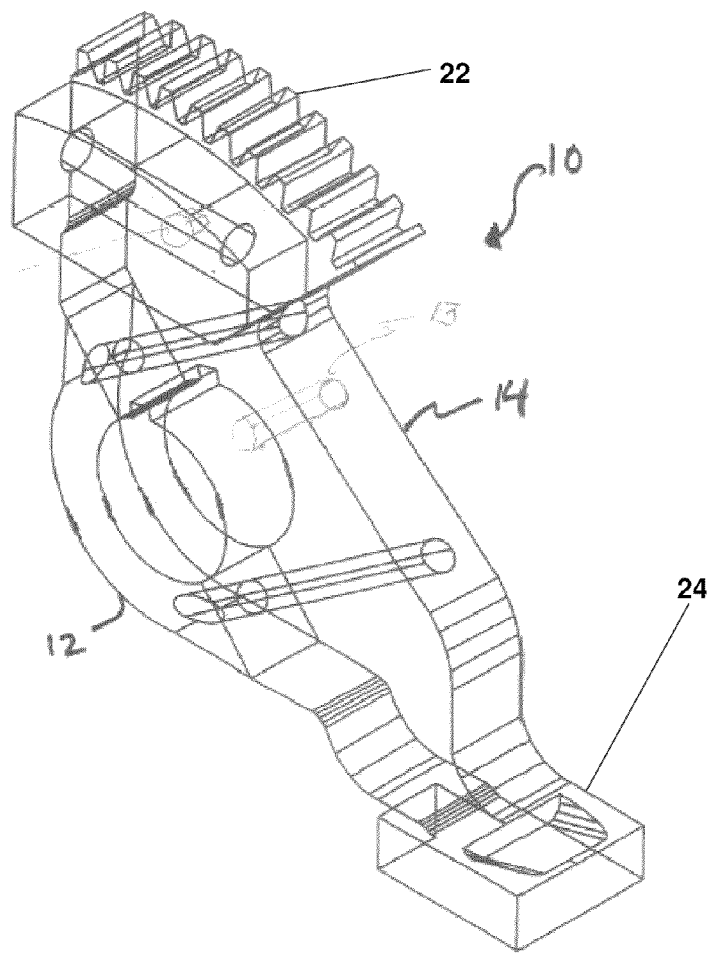
FIG. 1C is a perspective drawing of the split sector gear.
Figure 1D:
FIGS. 1D and 1E are, respectively, close-up views of a opposite sides of a portion of the split sector gear.
Figure 1E:
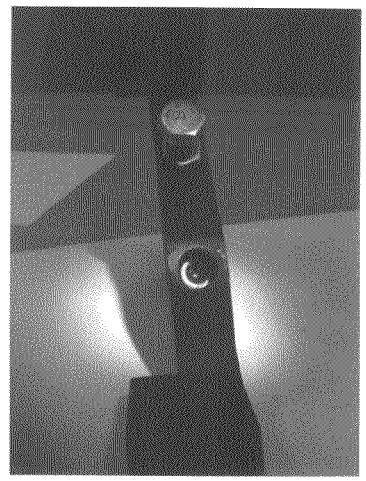

Referring to the drawing and photographs of FIGS. 1A-2B, an improved replacement split sector gear 10 is provided for a train stop or tripper.

According to the disclosure, the split sector gear 10 is cut into sections, e.g. halves 12, 14. The split sector gear is tapped with threads, e.g. ½-20 thread, and 3-inch Allen head bolts 16, 18 are engaged to butt the sections 12, 14 together around to form a hole 20 sized to receive a shaft, satisfying performance specifications. The improved split gear 10 is thus constructed to be bolted onto the tripper shaft 20, which allows replacement of the gear in less time, by a smaller crew, and with fewer tools.

The upper half 14 of the split sector gear 10 includes gears 22 formed in one end and a return spring engagement member 24 at an opposite end. The upper half 14 of the split sector gear defines a keyway 25 which is configured to engage a protrusion on the shaft 20. Engagement between the keyway 25 and the shaft 20 as well as engagement between a set bolt 13 and the shaft 20 maintain rotational alignment between the shaft 20 and the split sector gear 10.

The split sector gear 10 can be installed in a train stop such as the PS1 Automatic Train Stop commercially available from TWINCO MFG. CO. INC. (Hauppauge, N.Y.) or the EM-1 Automatic Train stop commercially available from Union Switch & Signal Inc. (Pittsburg, Pa.). Additional details regarding such train stops can be found in the PS-1 Automatic Train Stop product pamphlet (http:/www.twincomfg.com) and SM 5730 EM-1 Automatic Train Stop (Union Switch & Signal Inc., 2006).

Figure 2A:
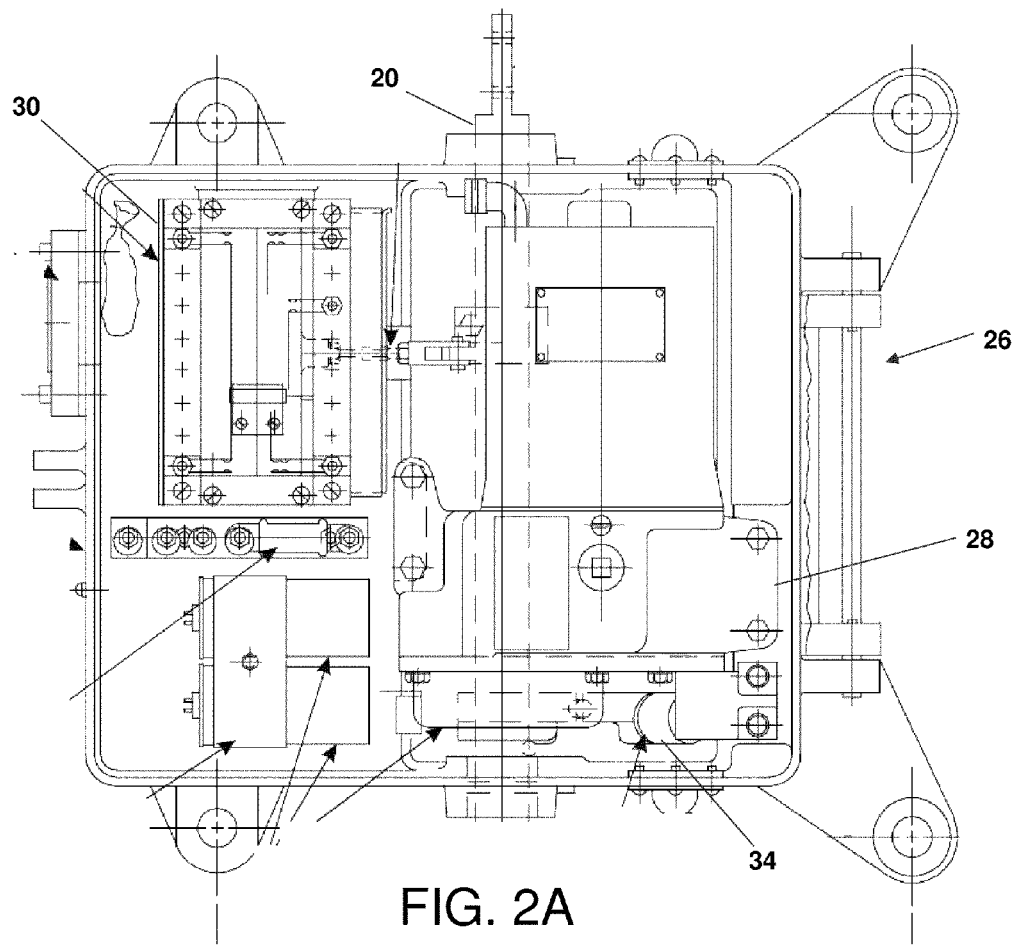
FIGS. 2A and 2B are plan and cross-sectional views of a train stop including a split sector gear.
Figure 2B:
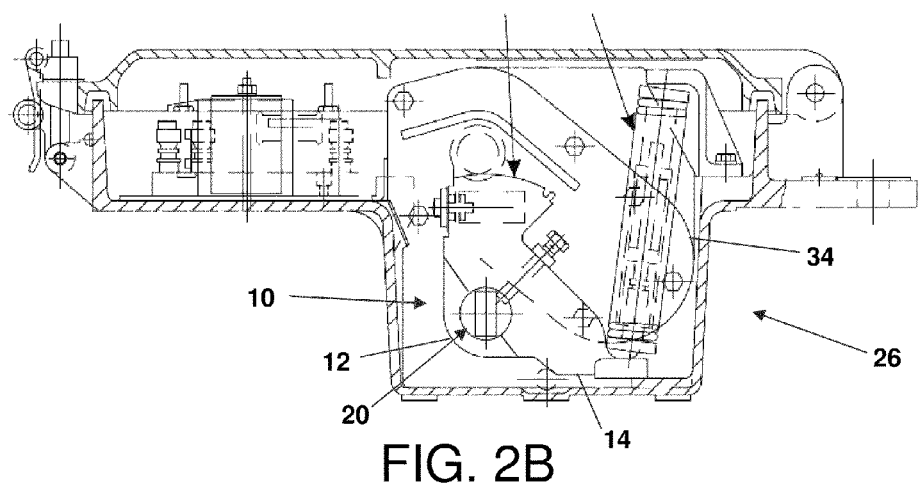

FIGS. 2A and 2B show the split sector gear 10 installed in an automatic train stop 26. In addition to split sector gear 10, the automatic train stop 26 includes a motor 28, a circuit breaker 30, gears 32, and a return spring 34. The circuit breaker 30 is configured to operate the motor 28. The gears 32 provide a mechanical connection between the motor 28 and the split sector gear 10.

When energized, the motor (via the gears 32) causes rotation of the split sector gear 10. The rotation of the split sector gear rotates shaft 20 and compresses the return spring 34. The rotation of shaft 20 lowers a trip arm (not shown) which is positioned to engage a trip cock lever on passing trains when the trip arm is raised. When the motor is de-energized (e.g., by switching the associated signal to red or by loss of power to the train stop), the return spring biases the trip arm back to its raised position. In the raised position, the trip arm will engage the trip cock lever of any train attempting to pass the signal, thus bringing it to a stop. Thus, the train stop causes the trip arm to automatically assume the stop position if the power is interrupted. A ratchet feature is incorporated in gears 32, to protect the drive train when the rotation of the motor and gear housing is reversed by the return spring 34.

The train stop 26 and its components including, in particular, the sector gear 10 experience ongoing mechanical stress during operation of trains over a rail line on which the train stop 26 is installed. Damage to the sector gear 10 can render the train stop 26 inoperable. In these circumstances, replacement of the sector gear 10 is performed to return the train stop 26 to the proper operating condition required by regulations regarding fail-safe operation of transit systems.

The split sector gear 10 can be replaced by a two-person crew with a set of Allen wrenches and a basic tool bag. It is not necessary to remove the shaft 20 from the train stop 26. After removing the cover of train stop 26, the crew unbolts the upper half 14 of the split sector gear 10 from the lower half 12 of the split sector gear 10. The crew then disengages the two portions of the split sector gear 10 from the other components of the train stop 26 and installs a new sector gear in about 30 minutes. This reduces the time that a work crew is on the "rails" holding up train traffic. In addition, reduced hours spent by crews on the tracks are statistically associated with reductions of associated deaths and injuries.

In contrast, replacement of unitary sector gears currently in use from a train stop can require removal of the shaft 20 and associated external components including the trip arm. Very close tolerances between the shaft 20 and the apertures through the casing of the train stop 26 through which the shaft 20 passes are required to achieve required levels of reliability. However, the close tolerances mean that even small burrs or other minor damage inflicted on the shaft 20 during operation can make it very difficult to remove the shaft.

A number of embodiments of the invention have been described. Nevertheless, it will be understood that various modifications may be made without departing from the spirit and scope of the invention. Accordingly, other embodiments are within the scope of the following claims.

What is claimed is:

1. A train stop comprising:
a motor;
a circuit breaker configured to operate the motor;
a sector gear mechanically connected to the motor such that operation of the motor rotates the sector gear in a first direction, the sector gear comprising:
a first portion with a first end defining gear teeth and a second end including a member configured to engage a spring;
a second portion detachably attachable to the first portion;
wherein the first portion can be attached to the second portion such that the first portion and the second portion together define a circular aperture sized to receive a shaft of the train stop;
the shaft of the train stop extending to a tripper arm disposed outside a casing of the train stop; and
the spring biasing the sector gear to rotate a second direction opposite the first direction.

2. The sector gear of claim 1, wherein the first portion and the second portion define aligned threaded recesses such that the first portion can be bolted to the second portion.

3. The sector gear of claim 2, comprising Allen bolts attaching the first portion to the second portion.

4. The sector gear of claim 1, wherein the first portion defines a threaded recess extending from a surface that defines a portion of the circular aperture through the first portion to an opposite side of the first portion, the threaded recess sized to receive a set screw.

5. The sector gear of claim 1, wherein the first portion defines a keyway on a surface that defines a portion of the circular aperture.

6. A train stop comprising:
a motor;
a circuit breaker configured to operate the motor;
a shaft extending to a tripper arm disposed outside a casing of the train stop, the tripper arm configured to engage a trip cock lever on passing trains when the tripper arm is raised;
a sector gear mechanically connected to the motor such that operation of the motor rotates the sector gear in a first direction, the sector gear comprising:
a first portion with a first end defining gear teeth and a second end including a member configured to engage a spring;
a second portion detachably attachable to the first portion;
wherein the first portion can be attached to the second portion such that the first portion and the second portion together define a circular aperture which receives the shaft;
the spring biasing the sector gear to rotate a second direction opposite the first direction.

7. The sector gear of claim 6, wherein the first portion and the second portion define aligned threaded recesses such that the first portion can be bolted to the second portion.

8. The sector gear of claim 7, comprising ½×3 inch Allen bolts attaching the first portion to the second portion.

9. The sector gear of claim 6, wherein the first portion defines a threaded recess extending from a surface that defines a portion of the circular aperture through the first portion to an opposite side of the first portion, the threaded recess sized to receive a set screw.

10. The sector gear of claim 6, wherein the first portion defines a keyway on a surface that defines a portion of the circular aperture.

* * * * *

UNITED STATES PATENT AND TRADEMARK OFFICE
CERTIFICATE OF CORRECTION

PATENT NO. : 8,418,969 B2
APPLICATION NO. : 12/836551
DATED : April 16, 2013
INVENTOR(S) : Anthony Schena Page 1 of 1

It is certified that error appears in the above-identified patent and that said Letters Patent is hereby corrected as shown below:

Title Page, Item (56) Col. 2, line 1; Delete "PCT/US1010/042025;" and insert
-- PCT/US2010/042025; --, therefor Signed and Sealed this
Sixteenth Day of July, 2013

Teresa Stanek Rea
*Acting Director of the United States Patent and Trademark Office*